United States Patent
Jones

(10) Patent No.: US 12,522,689 B2
(45) Date of Patent: Jan. 13, 2026

(54) MANNICH BASE EPOXY CURATIVE, CURED EPOXY RESINS THEREOF AND METHODS OF PREPARING THE SAME

(71) Applicant: Paul Jones, Wrightington (GB)

(72) Inventor: Paul Jones, Wrightington (GB)

( * ) Notice: Subject to any disclaimer, the term of this patent is extended or adjusted under 35 U.S.C. 154(b) by 601 days.

(21) Appl. No.: 17/795,499

(22) PCT Filed: Nov. 2, 2020

(86) PCT No.: PCT/GB2020/052772
§ 371 (c)(1),
(2) Date: Jul. 26, 2022

(87) PCT Pub. No.: WO2021/152281
PCT Pub. Date: Aug. 5, 2021

(65) Prior Publication Data
US 2023/0357489 A1    Nov. 9, 2023

(30) Foreign Application Priority Data

Jan. 28, 2020   (GB) .................................... 2001192

(51) Int. Cl.
C08G 59/50    (2006.01)
C07D 307/52   (2006.01)
C08G 59/64    (2006.01)

(52) U.S. Cl.
CPC .......... *C08G 59/504* (2013.01); *C08G 59/64* (2013.01)

(58) Field of Classification Search
None
See application file for complete search history.

(56) References Cited

U.S. PATENT DOCUMENTS

| | | | |
|---|---|---|---|
| 3,268,466 A | 8/1966 | Simm | |
| 3,896,080 A * | 7/1975 | Vargiu | C08L 63/00 528/110 |
| 4,219,485 A * | 8/1980 | Dunlop | C08G 18/1825 528/73 |
| 4,347,191 A | 8/1982 | Cooper et al. | |
| 4,426,460 A * | 1/1984 | Pentz | C08G 65/36 544/193 |
| 4,483,968 A * | 11/1984 | Semmler | C08K 5/17 525/401 |
| 2016/0185896 A1 | 6/2016 | Panchenko et al. | |

FOREIGN PATENT DOCUMENTS

| | | | | |
|---|---|---|---|---|
| CN | 102604400 A | * | 7/2012 | |
| CN | 106674214 A | * | 5/2017 | .......... H05K 1/0346 |
| CN | 109504039 A | * | 3/2019 | ............. C08L 63/00 |
| EP | 0 779 311 | | 6/1997 | |
| EP | 3 017 001 | | 5/2016 | |
| GB | 985175 A | * | 3/1965 | |
| JP | 60025989 A | * | 2/1985 | |
| JP | 9-202821 | | 8/1997 | |
| WO | 2015/001061 | | 1/2015 | |

OTHER PUBLICATIONS

Hanifpour et al., "Poly(furfuryl alcohol) bioresin-modified Ly5210 epoxy thermoset," Journal of polymer Research, vol. 26:198, p. 1-9 (Year: 2019).*
Search Report for GB Application No. 2001192.0 dated Jul. 29, 2020, 5 pages.
International Search Report for PCT/GB2020/052772 dated Dec. 14, 2020, 3 pages.
Written Opinion of the ISA for PCT/GB2020/052772 dated Dec. 14, 2020, 5 pages.

* cited by examiner

*Primary Examiner* — Ha S Nguyen
(74) *Attorney, Agent, or Firm* — Nixon & Vanderhye, P.C.

(57) ABSTRACT

The invention relates to a Mannich base useful as an epoxy curative agent. In particular, the present invention is directed to a Mannich base derived from furfuryl alcohol, or a homopolymer or co-polymer thereof, an epoxy resin curative composition comprising the Mannich base, a cured epoxy resin obtainable using the composition, processes for preparing the Mannich base and uses thereof. An example of a Mannich base derived from furfuryl alcohol in accordance with the present invention is shown below (Structure I):

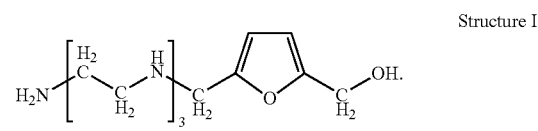

Structure I

17 Claims, No Drawings

MANNICH BASE EPOXY CURATIVE, CURED EPOXY RESINS THEREOF AND METHODS OF PREPARING THE SAME

CROSS-REFERENCE TO RELATED APPLICATIONS

This application is the U.S. national phase of International Application No. PCT/GB2020/052772 filed Nov. 2, 2020 which designated the U.S. and claims priority to GB Patent Application No. 2001192.0 filed Jan. 28, 2020, the entire contents of each of which are hereby incorporated by reference.

The invention relates to a Mannich base useful as an epoxy curative agent. In particular, the present invention is directed to a Mannich base derived from furfuryl alcohol, or a homopolymer or co-polymer thereof, an epoxy resin curative composition comprising the Mannich base, a cured epoxy resin obtainable using the composition, processes for preparing the Mannich base and uses thereof.

BACKGROUND OF THE INVENTION

There is an array of cross-linking agents available for epoxy functional materials, but amines and products derived therefrom offer the greatest versatility for curing epoxy resins. Collectively, these materials offer the means for formulating systems that can provide the potential for curing in thin films and/or mass at a broad spectrum of temperatures. Historically, phenolic derived Mannich base curing agents have been used extensively. However, due to regulatory and toxicity issues, the use and availability of these materials is in substantial decline and focus is shifting to more environmentally friendly alternatives.

Many commercial curing agent formulations are based on aliphatic amines, including cyclo-aliphatic and araliphatic amines, as well as to a lesser extent aromatic amines, or combination thereof. These amines are generally modified in order to enhance their processing and/or performance aspects, as well as to improve the active hydrogen equivalent weight combining ratio with epoxy resins or to reduce the toxicity of the amine curative agent.

Mannich bases are examples of modified amines which offer enhanced properties, especially with regard to improved compatibility with epoxy resins, optimisation of cure speed and degree of cure, as well as reduction to resistance to carbamation. Commercially available Mannich bases include phenolic derived compounds that are the reaction product of an aldehyde (generally formaldehyde), a phenolic compound, or a substituted derivative thereof, and an amine having primary or secondary amino groups. An example structure of a phenolic Mannich base is shown below:

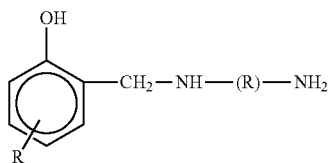

Phenolic Mannich Base

EP0779311 describes a Mannich base prepared by reacting (i) butyraldehyde, (ii) a phenolic compound, and (iii) a primary or a secondary polyamine. The use of butyraldehyde, rather than formaldehyde or paraformaldehyde, is reported to lower viscosity in the Mannich base products, which can be advantageous when used in epoxy curative applications.

However, the molecular weight, polydispersity and residual free phenol monomer levels has led to the reduction in availability and a decline in popularity of this class of materials. There remains a need for alternative Mannich bases that offer high process performance, broad compatibility with epoxy resins, and avoid the toxicity and environmental issues associated with known amine-derived epoxy resin curatives.

The present invention is based on the surprising discovery of a new class of Mannich base, which finds particular application as an epoxy resin curative, which is derived from furfuryl alcohol, polyfurfuryl alcohol and/or a co-polymer of furfuryl alcohol.

SUMMARY OF THE INVENTION

In one aspect, the present invention provides a method of preparing a Mannich base for use as an epoxy resin curative, said method comprising:
 i) contacting a) furfuryl alcohol, polyfurfuryl alcohol, and/or a co-polymer of furfuryl alcohol with b) a primary or secondary monoamine and/or a polyamine comprising primary and/or secondary amino groups; and
 ii) obtaining a Mannich base.

In another aspect, the present invention provides a Mannich base prepared, or preparable, by the methods described herein.

In a further aspect, the present invention comprises an epoxy resin curative composition comprising the Mannich base derived from furfuryl alcohol, polyfurfuryl alcohol and/or a co-polymer of furfuryl alcohol, as described herein.

In yet a further aspect, the present invention provides an epoxy resin curative composition comprising the Mannich base derived from furfuryl alcohol, polyfurfuryl alcohol and/or a co-polymer of furfuryl alcohol as described herein.

In still a further aspect, the present invention provides a method for preparing a cured epoxy resin, said method comprising:
 a) contacting an epoxy resin with a Mannich base derived from furfuryl alcohol, polyfurfuryl alcohol and/or a co-polymer of furfuryl alcohol as described herein; and
 b) forming a cured epoxy resin.

In a still further aspect, the invention provides a cured epoxy resin prepared, or preparable, by the methods described herein.

In another aspect, the present invention provides the use of furfuryl alcohol, polyfurfuryl alcohol or a co-polymer of furfuryl alcohol for forming an epoxy resin curative.

In another aspect, the present invention provides the use of a Mannich base as defined herein for crosslinking an epoxy resin.

In another aspect, the present invention provides the use of a Mannich base as defined herein for imparting chemical resistance to a cured epoxy resin.

DETAILED DESCRIPTION

The present invention relates to a hitherto unknown class of curing agent for epoxy resin compositions that offer high bio-derived content and desirable cured epoxy performance, including chemical resistance, preparable with low or no residual toxic materials. The novel epoxy curing agents of the invention may be prepared via several different methods that are analogous to those employed in conventional phenol-based Mannich base reactions. Processing can, for instance, be undertaken with or without modification with an aldehyde (for example, formaldehyde). Processing can also be with the homo-polymer of furfuryl alcohol (polyfurfuryl alcohol) or co-polymers thereof, for instance co-polymers including phenol species. The process is readily adaptable and can be readily integrated into epoxy curative preparation systems used for producing conventional epoxy curatives.

Furfural is directly derived from biomass with well-established production and purification methods. It is produced from the hydrolysis of several pentosane-rich, abundant biomass (such as corncob and sugarcane) and as such, any resin or polymeric compound derived from furfural is regarded as a petrochemical-free, biomass origin resin.

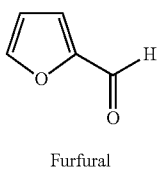

Furfural

Most of the furfural produced is converted by hydrogenation into furfuryl alcohol (FA):

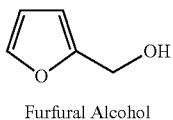

Furfural Alcohol

Furfuryl alcohol can be readily polymerized through cationic condensation to obtain polyfurfuryl alcohol (PFA):

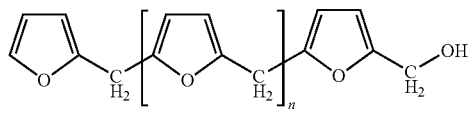

n=an integer (e.g. from 1 to 100, from 1 to 50, from 1 to 20 or from 1 to 10 etc.)
Polyfurfuryl Alcohol (PFA)

Polyfurfuryl alcohol (PFA) resins are known and are generally employed with acidic catalysts as homo-polymers or co-polymers with phenolic species to generate fire resistant coatings or matrix materials. Whilst monomeric furfuryl alcohol is generally considered to be toxic, PFA polymers can be produced with low residual furfuryl alcohol content, thereby reducing their hazard rating.

As can be seen, furfuryl alcohol and polyfururyl alcohol have a methylol/terminal methylol functional group. It has been found by the inventor that furfuryl alcohol, polyfurfuryl alcohol and/or a co-polymer of furfuryl alcohol may be contacted with primary or secondary amines and undergo a Mannich-type reaction and generate a furfuryl alcohol-derived Mannich base, which has been found to be particularly suitable as an epoxy resin curative. Thus, in one aspect, the present invention provides a method of preparing a Mannich base for use as an epoxy resin curative, said method comprising: i) contacting a) furfuryl alcohol, polyfurfuryl alcohol, and/or a co-polymer of furfuryl alcohol with b) a primary or secondary monoamine and/or a polyamine comprising primary and/or secondary amino groups; and ii) obtaining a Mannich base. In another aspect, the present invention provides a Mannich base prepared, or preparable, by the method.

As will be appreciated, in order to obtain the Mannich base, contact of furfuryl alcohol (or polymeric derivative thereof) and the amine, for example by means of thorough mixing with an appropriate stirring means in a suitable vessel, is conducted under appropriate conditions of heating in order to elicit the Mannich reaction, whilst controlling exotherms (the reaction is typically spontaneous and is exothermic). A suitable temperature at which the contacting step is conducted may be, for example, be from 60 to 100° C., preferably from 60 to 80° C. or from 80 to 100° C. A typical molar ratio of amine to furfuryl alcohol, polyfurfuryl alcohol and/or a co-polymer of furfuryl alcohol is 0.1:1 to 10:1, preferably 0.75:1 to 5:1, more preferably from 1:1 to 3:1.

The presence of an aldehyde compound is not believed to be necessary in all circumstances in the formation of the Mannich base of the present invention, primarily as a result of the methylol functionality of the furfuryl alcohol/terminal methylol functional group of polyfurfuryl alcohol and co-polymers of furfuryl alcohol. This allows direct reaction of a primary or secondary amine following ring-opening and transition via a Levulinic acid structure.

Nevertheless, in preferred embodiments, the contacting step i) is performed in the presence of an aldehyde compound and/or, after contacting step i) is undertaken, the product of that step is modified by a condensation reaction with an aldehyde. Incorporating an aldehyde compound into the synthesis generates higher functionality, and can be achievable before or during the contacting step, as well as part of a post-manufacture modification of the product.

When the contacting step i) is performed in the presence of an aldehyde, the aldehyde may be added, either continuously over a period, or incrementally, to the reaction mixture. Alternatively or additionally, the polyamine or monoamine may be pre-reacted/pre-modified with an aldehyde, prior to contact with furfuryl alcohol, polyfurfuryl alcohol or a co-polymer of furfuryl alcohol. For instance, the monoamine/polyamine and an aldehyde can be pre-reacted to generate the corresponding methylol amine compound which may further react.

An example Mannich structure obtainable by the methods of the present invention is shown below (Structure I). In this example, triethylenetetramine (TETA) is pre-reacted with formaldehyde before reaction with furfuryl alcohol (the methylol group of the furfuryl alcohol remains intact) (molar ratio of reactants: 1:1:1:TETA:HCOH:FA).

Structure I

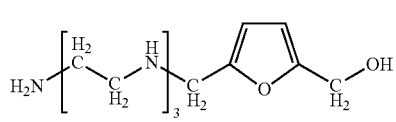

Another example Mannich structure obtainable by the methods of the present invention is shown below (Structure II). As above, triethylenetetramine (TETA) is pre-reacted with formaldehyde and then additional TETA is added for the subsequent reaction with furfuryl alcohol which also reacts with the methylol group thereof (molar ratio of reactants: 2:1:1 TETA:HCOH:FA).

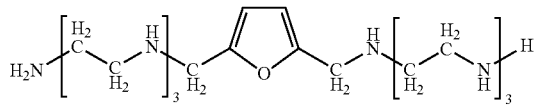

Another example Mannich structure obtainable by the methods of the present invention is shown below (Structure III). In this example, triethylenetetramine (TETA) is pre-reacted with formaldehyde before reaction with polyfurfuryl alcohol (the terminal methylol group of the polyfurfuryl alcohol remains intact) (molar ratio of reactants: 1:1:1: TETA:HCOH:PFA) (n=an integer (e.g. from 1 to 100, from 1 to 50, from 1 to 20 or from 1 to 10 etc.)

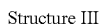

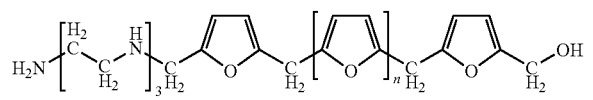

Thus, in preferred embodiments, the method comprises contacting furfuryl alcohol with a polyamine comprising primary and/or secondary amino groups, and wherein, prior to the contacting step i), the polyamine comprising primary and/or secondary amino groups is modified by a condensation reaction with an aldehyde.

In other preferred embodiments, the method comprises contacting polyfurfuryl alcohol and/or a co-polymer of furfuryl alcohol with a primary or secondary monoamine and/or a polyamine comprising primary and/or secondary amino groups, and, prior to the contacting step i), the polyfurfuryl alcohol and/or a co-polymer of furfuryl alcohol is modified by a condensation reaction with an aldehyde.

When the polyamine or polyfurfuryl alcohol and/or a co-polymer of furfuryl alcohol are modified by a condensation reaction with aldehyde, or reacted in the presence of an aldehyde in accordance with embodiments described herein, a typical molar ratio of aldehyde to the polyamine or the furfuryl alcohol derivative is from 0.1:1 to 10:1, preferably 0.5:1 to 5:1, more preferably from 1:1 to 3:1.

Where aldehyde addition is undertaken as part of the method, water that is formed from the condensation with aldehyde is typically removed by distillation. Further condensation following the reaction of the amine may then eliminate additional water as part of the formation of the Mannich base end product, which may also be removed conveniently by means of distillation. Alternatively or additionally, the product can be further purified by distillation to further reduce the amount of free amine and/or any added solvent which may be used to act as a carrier for the removal of unwanted residual furfuryl alcohol monomer through distillation either under atmospheric or vacuum conditions.

The co-polymer of furfuryl alcohol that may be used in accordance with the present invention may correspond to the reaction product of furfuryl alcohol and an aldehyde, as discussed hereinabove. Alternatively or additionally, the co-polymer can be derived from the reaction of furfuryl alcohol with phenol or a substituted derivative thereof. The phenol component used to prepare the phenolic modified co-polymer resin includes any phenol typically used in preparing phenolic resole resins. These phenolic compounds are not substituted at either of the two ortho-positions or at one ortho- and the para-position—such unsubstituted positions being necessary for the desired polymerization or Mannich reactions to occur.

Phenols substituted in the above-mentioned positions may be used in lesser quantities (e.g., up to about 30 weight %, and preferably not more than about 10 weight %, of the phenol component employed in the formation of the co-polymer) since phenols with this form of substitution can effectively act as chain terminators to control molecular weight, as is known in the art. Generally, any one, all, or none of the remaining carbon atoms of the phenol ring can be substituted in a conventional fashion. The nature of these substituents can vary widely, and it is only necessary that the substituent does not interfere in the polymerization of the aldehyde or furfuryl alcohol with the phenol at the ortho- and/or para-positions thereof.

Substituted phenols employed in the formation of the furfuryl alcohol-phenolic resin co-polymer include, for example, alkyl substituted phenols, aryl substituted phenols, aralkyl substituted phenols, cycloalkyl substituted phenols, alkenyl-substituted phenols, alkoxy substituted phenols, aryloxy substituted phenols, and halogen-substituted phenols, the foregoing substituents possibly containing from 1 to 26, and preferably from 1 to 9, carbon atoms in total.

Specific examples of suitable substituted phenols for preparing the co-polymer resin composition of the present invention include: o-cresol, m-cresol, p-cresol, 3,5-xylenol, 3,4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, phenylethyl, 3,5-dimethoxy phenol, 3,4,5-trimethoxy phenol, p-ethoxy phenol, p-butoxy phenol, 3-methyl-4-methoxy phenol, p-phenoxy phenol and mixtures thereof. Further examples of substituted phenols include di-functional phenols such as resorcinol, catechol, or hydroquinone or p,p'-dihydroxy bi-phenyl. Unsubstituted phenol is nevertheless preferred for use in forming a co-polymer in accordance with embodiments of the present invention.

The aldehyde employed in embodiments of the invention discussed herein can be used alone or in combination with any of the aldehydes or their equivalents heretofore employed in the formation of phenolic resole resins, preferred examples of which including acetaldehyde, propionaldehyde, butylaldehyde furfuraldehyde, and benzaldehyde. In general, the aldehydes employed in connection with the present invention have the formula: $R_1CH=O$, wherein $R_1$ is a hydrocarbyl group, preferably having from 1 to 8 carbon atoms.

Furthermore difunctional aldehydes can be used in the preparation of the Mannich base and could advantageously be used to introduce cross-links into the cured resin. Formaldehyde is nevertheless most preferred and can be supplied in any one of its commonly available forms, for instance as an aqueous solution of the gas or in polymerized form as paraformaldehyde.

In general, the monoamine or polyamine employed in the present invention can be any amine containing a single or multiple primary or secondary amino groups, respectively, including compounds that may also additionally contain tertiary amino groups. Monoamines useful in accordance with embodiments of the present invention include primary monoamines of the formula $R_xNH_2$, as well as secondary amines of the formula: $R_xR_yNH$, where $R_x$ and $R_y$ are independently selected from a hydrocarbyl group, and preferably wherein the monoamine has a molecular weight of from 100 to 1000 mol/g, more preferably from 100 to 500 mol/g.

Reference to a "hydrocarbyl group" herein (i.e. in connection with the aldehyde and the amine) may be an aromatic or preferably saturated aliphatic or unsaturated aliphatic, group formed predominantly of carbon and hydrogen atoms. The hydrocarbyl group may be optionally substituted by one or more groups that are preferably selected from hydroxyl (—OH) groups, carboxylic acid groups, $C_1$ to $C_4$ alkoxy, $C_2$ to $C_8$ alkoxyalkoxy, $C_3$ to $C_6$ cycloalkyl, —$CO_2$ ($C_1$ to $C_6$)alkyl, and —OC(O)($C_1$ to $C_6$)alkyl. Additionally or alternatively, one or more of the carbon atoms, and any substituents attached thereto, of the hydrocarbyl group may be replaced with an oxygen atom (—O—), provided that the oxygen atom is not bonded to another heteroatom.

The hydrocarbyl group may be entirely aliphatic or a combination of aliphatic and aromatic portions. In some examples, the hydrocarbyl group includes a branched aliphatic chain which is substituted by one or more aromatic groups. Examples of hydrocarbyl groups therefore include acyclic groups, as well as groups that combine one or more acyclic portions and one or more cyclic portions, which may be selected from carbocyclic and aryl groups. The hydrocarbyl group includes monovalent groups and polyvalent groups as specified and may, for example, include one or more groups selected from alkyl, alkenyl, alkynyl, carbocyclyl (e.g. cycloalkyl or cycloalkenyl) and aryl.

Preferably the amine can be any carbon chain that is branched or linear, cycloaliphatic, araliphatic, aromatic with ether groups present, and may include substitution with other functional or non-functional materials.

In preferred embodiments, the monoamine is selected from alkyl monoamines, alkanolamines and poly(alkylene oxide) amines.

Specific examples of primary monoamines include allylamine; benzylamine; ethanolamine; isopropanolamine; 3-amino-1-propanol; 3-ethoxypropylamine; 3-propoxypropylamine; 3-isopropoxypropylamine; 2-(2-aminoethoxy) ethanol; 3-(dimethylamino)propylamine, 3-(diethylamino) propylamine; 1-(3-aminopropyl) imidazole; cyclohexylamine; 3-(aminomethyl)pyridine; 2-aminopyridine; 2,4-diethylaniline, 2,6-diethylaniline; 2-aminopyrimidine.

Specific examples of suitable poly(alkylene oxide) amines are the Jeffamine® M-600, Jeffamine M-1000, Jeffamine M-2005, and Jeffamine M-2070 amines. Specific examples of suitable diamines are Jeffamine D-2000, Jeffamine ED-600, Jeffamine ED-900, and Jeffamine ED-2001 amines, available from Huntsman corporation.

In embodiments, the polyamine used in accordance with the invention is selected from: 1) an aliphatic primary di- or tri-amine; preferably an ether-group-containing aliphatic primary di- or tri-amine; 2) an aliphatic secondary amino-containing tri-amine having two primary aliphatic amino groups; 3) a polyamine having one or two secondary amino groups, preferably products of the reductive alkylation of primary aliphatic polyamines with aldehydes or ketones; or 4) an aromatic polyamine.

Suitable polyamines include aliphatic primary (including cycloaliphatic or arylaliphatic diamines) selected from: 2,2-dimethyl-1,3-propanediamine, 1,3-pentanediamine (DAMP), 1,5-pentanediamine, 1,5-diamino-2-methylpentane (MPMD), 2-butyl-2-ethyl-1,5-pentanediamine (C11-nododiamine), 1,6-hexanediamine, 2,5-dimethyl-1,6-hexanediamine, 2,2 (4), 4-trimethylhexamethylenediamine (TMD), 1,7-heptanediamine, 1, 8-octanediamine, 1,9-nonanediamine, 1,10-decanediamine, 1,11-undecandiamine, 1,12-dodecanediamine, 1,2-,1,3- or 1,4-diaminocyclohexane, bis(4-aminocyclohexyl) methane (H 12-MDA), bis (4-amino-3-methylcyclohexyl) methane, bis(4-amino-3-ethylcyclohexyl) methane, bis(4-amino-3,5-dimethylcyclohexyl) methane, bis(4-amino-3-ethyl-5-methylcyclohexyl) methane, 1-amino-3-aminomethyl-3,5,5-trimethylcyclohexane (isophoronediamine or IPDA), 2- or 4-methyl-1,3-diaminocyclohexane or mixtures thereof, 1,3-bis(aminomethyl) cyclohexane, 1,4-bis(aminomethyl) cyclohexane, 2,5 (2,6)-bis(aminomethyl) bicyclo [2.2.1] heptane (NBDA), 3(4), 8(9)-Bis(aminomethyl) tricyclo [5.2.1.0$^{2'6}$] decane, 1,4-diamino-2,2,6-trimethylcyclohexane (TMCDA), 1,8-Me N-thandiamin, 3,9-bis(3-aminopropyl)-2,4,8,10-tetraoxaspiro [5.5] undecane, 1,3-bis(aminomethyl) benzene (MXDA), 1,4-bis(aminomethyl) benzene, and combinations thereof; or wherein the polyamine is an aliphatic primary triamine selected from 4-aminomethyl-1, 8-octanediamine, 1,3,5-tris(aminomethyl) benzene, 1,3,5-tris(aminomethyl) cyclohexane, tris(2-aminoethyl) amine, tris(2-amino-propyl) amine, tris(3-aminopropyl) amine and combinations thereof.

Suitable ether-group-containing aliphatic primary di-amines include those selected from: bis (2-aminoethyl) ether, 3,6-dioxaoctane-1,8-diamine, 4,7-dioxadecane-1, 10 diamine, 4,7-dioxadecane-2,9-diamine, 4,9-dioxadodecane-1,12-diamine, 5,8-dioxadodecane-3,10-diamine, 4,7,10-trioxatridecan-1,13-diamine, or oligomers of any of the foregoing; polytetrahydrofurandiamines, such as bis(3-aminopropyl) polytetrahydrofurans, cycloaliphatic diamines containing ether groups preferably derived from propoxylation and subsequent amination of 1,4-dimethylol cyclohexane (for example, available as Jeffamine® particular RFD 270 (Huntsman)), and polyoxyalkylenediamines, such as polyoxypropylenediamines, preferably derived from amination of polyoxyalkylenediols, for example, those available under the name Jeffamine (from Huntsman), under the name polyetheramine (from BASF) or under the name PC Amine® (from Nitroil). In particular, suitable polyoxyalkylene di- or triamines are Jeffamine® D-230, Jeffamine® D-400, Jeffamine® D-2000, Jeffamine® EDR-104, Jeffamine® EDR-148, Jeffamine® EDR-176, Jeffamine® T-403, Jeffamine® T-3000, Jeffamine® T-5000, or the corresponding amines by BASF or Nitroil.

Suitable ether-group-containing aliphatic primary tri-amines are selected from polyoxyalkylenetriamines, preferably derived from amination of polyoxyalkylenetriols. Suitable aliphatic secondary amino-containing tri-amines having two primary aliphatic amino groups are selected from: 3-(2-aminoethyl) aminopropylamine, bis(hexamethylene) tri-amine (BHMT), diethylenetriamine (DETA), triethylenetetramine (TETA), tetraethylenepentamine (TEPA), pentaethylenehexamine (PEHA) or higher homologs of linear polyethyleneamines such as polyethylenepolyamine with 5 to 7 ethylenepolyamine units (HEPA), products of the multiple cyanoethylation or cyanobutylation and subsequent hydrogenation of primary polyamines having at least two primary amino groups, such as Dipropylenetriamine (DPTA), N-(2-aminoethyl)-1,3-propanediamine (N3-amine), N,N'-bis(3-aminopropyl) ethylenediamine (N4-amine), N,N'-bis (3-aminopropyl)-1,4-diaminobutane, N5-(3-aminopropyl)-2-methyl-1,5-pentanediamine, N3-(3-aminopentyl)-1,3-pentanediamine, N5-(3-Amino-1-ethyl-propyl)-2-methyl-1,5-pentanediamine, N,N'-bis (3-amino-1-ethyl-propyl)-2-methyl-1,5-pentanediamine, and combinations thereof.

Suitable polyamines having one or two secondary amino groups are those selected from: $N^1$-benzyl-1,2-propanediamine, $N^1$-(4-methoxybenzyl)-1,2-propanediamine, N-benzyl-1,3-bis (aminomethyl) benzene, N,N'-Dibenzyl-1,3-bis (aminomethyl) benzene, N-2-ethylhexyl-1,3-bis (aminonyl) benzene, N,N'-bis(2-ethylhexyl)-1,3-bis(aminomethyl) benzene, and partially styrenated polyamines, such as partially styrenated 1,3-bis(aminomethyl) benzene (MXDA) (available from Mitsubishi gas Chemical)

Suitable aromatic polyamines are selected from m- and p-phenylenediamine, 4,4'-, 2,4'- and/or 2,2'-diaminodiphenylmethane, 3,3'-dichloro-4,4'-diaminodiphenylmethane (MOCA) diisocyanate, 2,4- and/or 2,6-toluene diamine (available as Ethacure 300 from Albemarle®), mixtures of 3,5-dimethylthio-2,4- and -2,6-toluene diamine, mixtures of 3,5-diethyl-2,4- and -2,6-toluylenediamine (DETDA), 3,3', 5,5'-tetraethyl-4,4'-diaminodiphenylmethane (M-DEA), 3,3',5,5'-tetraethyl-2,2'-dichloro-4,4'-diaminodiphenylmethane (M-CDEA), 3,3'-diisopropyl-5,5'-dimethyl-4,4'-diaminodiphenylmethane (M-MIPA), 3,3',5,5'-tetraisopropyl-4,4'-diaminodiphenylmethane (M-DIPA), 4,4'-diamino diphenylsulfone (DDS), 4-amino-N-(4-aminophenyl) benzenesulfonamide, 5,5'-methylenedianthranilic acid, dimethyl (5,5'-methylenedithethranilate), 1,3-propylenebis(4-aminobenzoate), 1,4-butylenebis(4-aminobenzoate), polytetramethyleneoxide-bis(4-aminobenzoate), 1,2-bis(2-aminophenylthio)ethane, 2-methylpropyl (4-chloro-3,5-diaminobenzoate), t-Butyl (4-chloro-3,5-diaminobenzoate), and combinations thereof.

The amines described above can also be adducted with epoxides or epoxy resins and further modification may be possible with fatty acids to form amido or polyamides.

In another aspect, the present invention provides an epoxy resin curative composition comprising the Mannich prepared or preparable by the methods described herein. The Mannich base curative agents according to the present invention may be used as as sole curing agents or in combination with other co-curing agents for epoxy resin systems. The Mannich base obtained by the method of the present invention may also be modified with an accelerator (for example, by dissolution of the accelerator in the Mannich base curative agent) preferably selected from acidic accelerators (such as salicylic acid), tertiary amines and imidazoles common in the art. Typical concentrations of such accelerators, if present, may be from 0.1% to 10% of the Mannich Base curing agent, preferably from 1% to 5%. The Mannich base may also be diluted or modified with suitable diluents or extenders known in the prior art.

In preferred embodiments, the epoxy resin curative composition comprises less than 0.1 wt. % of free furfuryl alcohol monomer. More preferably, the composition comprises less than 100 ppm, even more preferably less than 50 ppm, of free furfuryl alcohol monomer. The content of free furfuryl alcohol monomer may be reduced, or substantially eliminated, in the curative compositions according to the present invention through the use of polyfurfuryl alcohol in the preparation of the Mannich base of the invention; use of an excess of amine reagent where furfuryl alcohol monomer is employed and/or through purification techniques, for instance distillation.

The present invention thus also provides a method for preparing a cured epoxy resin, said method comprising:
a) contacting an epoxy resin with a Mannich base as described herein; and
b) forming a cured epoxy resin.

In a further aspect, the present invention thus also provides a cured epoxy resin prepared, or preparable, by the method.

The Mannich Base curing agent is present in an amount effective to cure the epoxy resin. The skilled person appreciates that an effective amount of the Mannich base may be determined based on the stoichiometry of the reaction with the epoxy resin. For example, the stoichiometric molar ratio of epoxy groups in the epoxy resin to amine hydrogens in the Mannich Base may range, for instance, from 1.5:1 to 1:1.5, more preferably from 1.2:1 to 1:1.2. In another example, the weight ratio of the epoxy resin to Mannich Base curing agent is from 1:1 to 5:1, preferably from 2:1 to 3:1. The epoxy resin can be blended or mixed with the Mannich Base curative agent of the present invention simultaneously or in any order at a temperature below the curing temperature, which is typically below 100° C.

The epoxy resin can be any epoxy resin which can be cured by the Mannich Base curing agent. Generally, the epoxy resin can be any curable epoxy resin and may have, for instance, a 1,2-epoxy equivalency greater than one and preferably, on the average, more than 1.5 epoxide groups per molecule. The epoxy resin can be saturated or unsaturated, linear or branched, aliphatic, cycloaliphatic, aromatic or heterocyclic, and may be substituted, provided such substituents do not interfere with the curing reaction.

Such substituents can include bromine. The epoxy resin may be monomeric or polymeric, liquid or solid, but is preferably liquid at room temperature. Examples of epoxy resins suitable for use in the invention include polyglycidyl ethers of polyhydric phenols, epoxidised novolacs or similar glycidated polyphenolic resins, polyglycidyl ethers of alcohols, glycols or polyglycols, and polyglycidyl esters of polycarboxylic acids.

Preferred epoxy resins are based on polyglycidyl ethers of a polyhydric phenol. Polyglycidyl ethers of polyhydric phenols can be produced, for example, by reacting an epihalohydrin with a polyhydric phenol in the presence of an alkali. Examples of suitable polyhydric phenols include: 2,2-bis (4-hydroxyphenyl) propane (bisphenol-A); 2,2-bis (4-hydroxy-3-tert-butylphenyl)propane; 1,1-bis(4-hydroxyphenyl) ethane; 1,1-bis(4-hydroxyphenyl) isobutane; bis(2-hydroxy-1-naphthyl) methane; 1,5-dihydroxynaphthalene; 1,1-bis(4-hydroxy-3-alkylphenyl) ethane and the like. Commercial examples of preferred epoxy resins include EPILOK 60-600.

Particularly preferred epoxy resins include 2,2-bis (4-hydroxyphenyl) propane (bisphenol-A) and epoxidised novolacs.

The epoxy resin to which the Mannich base curative of the present invention is added may include other additives, such as flow control additives, antifoam agents, or anti-sag agents, as well as other additives such as pigments, reinforcing agents, fillers, elastomers, stabilizers, extenders, plasticizers, or flame retardants depending on the application.

The present invention offers the means for preparing a cured epoxy resin using a Mannich base curative agent that is obtainable from a renewable source and preparable with low toxicity. The Mannich base curative of the present invention may be used to help lower the reliance on phenol derived curative agents. The Mannich base curative of the present invention has also been found to have a far lower hazard rating in comparison to conventional phenol derived curative agents.

Epoxy resins prepared in accordance with the present invention have been found to compare favourably with those prepared using conventional curative agents. Moreover, it has been found that cured epoxy resins prepared using the Mannich base of the present invention exhibit desirable resistance to chemical media. In particular, epoxy resins prepared using the Mannich base of the present invention have been found to exhibit superior acid resistance to known epoxy resins prepared using conventional phenolic-derived Mannich base epoxy curatives.

Thus, the Mannich base curative of the present invention offers a significantly improved hazard classification over analogous phenol-based curatives (and avoids the toxicity issues associated with epoxy resins obtained using phenol-based curatives), whilst maintaining the useful properties associated with a conventional Mannich base curing agent, and even imparting improved chemical resistance to the epoxy resin derived therefrom.

Further aspects of the invention include the use of furfuryl alcohol, polyfurfuryl alcohol or a co-polymer of furfuryl alcohol for forming an epoxy resin curative; the use of the Mannich base according to the invention for crosslinking an epoxy resin; and the use of the Mannich base of the invention for imparting chemical resistance (particularly acid resistance) to a cured epoxy resin.

The invention will now be described by reference to the following non-limiting Examples.

EXAMPLES

Example 1—Preparation of a Furfuryl Alcohol Mannich Base Epoxy Curative

A furfuryl alcohol Mannich base epoxy curative was prepared by the reaction of polyoxypropylene diamines, an aqueous solution of formaldehyde and furfuryl alcohol. The product was processed using equimolar quantities of materials and synthesised by first reacting the amine and formaldehyde, then reacting with furfuryl alcohol before performing a vacuum distillation to afford a substantially anhydrous product.

Specifically, 690 grams (3.0 moles) of polyoxypropylene diamines (Jeffamine® D230) and 246 grams (3.0 moles) of formaldehyde (36.5% Formalin solution) were added to a 2-liter, 3-necked round-bottom flask equipped with a thermometer, a mechanical agitator, and a Dean-Stark water trap connected to a condenser. The reaction mixture was heated to 80-100° C. over 60 minutes using a water bath, which was also used to maintain the desired temperature and avoid excessive heating (i.e. over 100° C.). The reaction mixture was then cooled to 60° C. and 294 grams (3.0 moles) of furfuryl alcohol were added incrementally over a 10-minute period whilst maintaining the temperature in the range of 60-80° C.

Following addition, the temperature was raised from 60-80° C. to 100° C. over a 30 minute period. This temperature was maintained for 1 hour before being increased from 100° C. to 120° C. over a 1-hour period to remove and recover 210 grams of water in the water trap. The reaction was monitored by way of an amine number titration, as well as by viscosity analysis of the retentate. Following the water removal, a vacuum was applied 10 for 20 minutes to remove the final residual distillate before cooling to 80-100° C. over the course of 20 minutes. 1020 grams of a clear dark amber/red liquid was obtained.

The product was analysed to determine dynamic viscosity and reactivity in the form of gel-time on reaction with liquid Bis Phenol "A" based epoxy resin (EPILOK 60-600). The curing reaction of the product with the resin was performed using the following method: i) the epoxy resin and the curing agent are allowed to equilibrate independently at the desired initial temperature (25° C.); ii) the epoxy resin and the curing agent are mixed in the designated ratio [combined 150 Gm mass] and iii) allowed to cure/react to an end point determined by a gel-timer (Techne gel-timer) which measures resistance torque. The results of this analysis are provided below in Table 1.

TABLE 1

| Appearance | Dark Coloured liquid |
|---|---|
| Active Hydrogen Equivalent Weight | 112 |
| Product dynamic viscosity @25° C. | 100 MPas |
| Reactivity [gel-time] | 280 Minutes |

A theoretical determination of the Active Hydrogen Equivalent Weight (AHEW) was also made for comparative purposes and is included in Table 1. This theoretical calculation divides the molecular weight of the molecule by the number of active hydrogen groups present. For example, in the case furfuryl alcohol reacted with polyoxypropylene diamines (Jeffamine® D230) in this example, the molecular weight would be 310 (98+230=328; 328−18 for the water liberated=310) divided by 3 (since one of the active hydrogens has condensed with the Furfuryl alcohol methylol group)=103.

The results in Table 1 compare favourably with conventional epoxy resin systems.

Example 2—Preparation of a Polyfurfuryl Alcohol Mannich Base Epoxy Curative

A polyfurfuryl alcohol Mannich base epoxy curative was prepared by the reaction of an ethylene amine, triethylene tetramine, an aqueous solution of formaldehyde and polyfurfuryl alcohol. The product was processed using equimolar quantities of materials and synthesised by first reacting the amine and formaldehyde, before subsequent reaction with the polyfurfuryl alcohol, followed by a final stage of vacuum distillation to afford a substantially anhydrous product.

Specifically, 876 grams (6.0 moles) of triethylene tetramine (having an average molecular weight of approximately 146) and 246 grams (3.0 moles) of formaldehyde (36.5% Formalin solution) were added to a 5-liter, 3-necked round bottom flask equipped with a thermometer, a mechanical agitator, and a Dean-Stark water trap connected to a condenser. The reaction mixture was heated to 80-100° C. over 60 minutes using a water bath, which was also used to maintain the desired temperature and avoid excessive heating (i.e. over 100° C.). The reaction mixture was then cooled to 60° C. and 2100 grams (3.0 moles) of polyfurfuryl alcohol were added incrementally over a 10 minute period whilst maintaining the temperature in the range of 60-80° C.

Following addition, the temperature was raised from 60-80° C. to 100° C. over a 30 minute period. This temperature was maintained for 1 hour before being increased from 100° C. to 120° C. over a 1-hour period to remove and recover 210 grams of water in the water trap. The reaction was monitored by way of an amine number titration, as well as by Brookfield viscosity analysis. Following the water removal, a vacuum was applied for 20 minutes to remove the final distillate before cooling to 80-100° C. over the course of 20 minutes. 3012 grams of a clear dark amber/red liquid was obtained.

The product was analysed to determine dynamic viscosity and reactivity in the form of gel-time on reaction with liquid Bis Phenol "A" based epoxy resin (EPILOK 60-600), following the same method described above in Example 1.

TABLE 2

| Appearance | Dark Coloured liquid |
|---|---|
| Active Hydrogen Equivalent Weight | 85 |
| Product dynamic viscosity @25° C. | 16,100 mPas |
| Reactivity [gel-time] | 24 Minutes |

A theoretical determination of the Active Hydrogen Equivalent Weight (AHEVV) was also made for comparative purposes, as described above for Example 1, the results of which are presented in Table 2. The results in Table 2 compare favourably with conventional epoxy resin systems.

Example 3—Comparison of Properties of Cured Epoxy Resins

A polyfurfuryl alcohol Mannich base epoxy curative, derived from the reaction of triethylene tetramine and prepared substantially as described in Example 2, was reacted with liquid Bis Phenol "A" based epoxy resin (EPILOK 60-600), following the same method described above in Example 1 to form a cured epoxy resin ("PFA-TETA cured epoxy"). For comparison, a conventional Phenol-TETA [Triethylenetetramine] derived Mannich base epoxy curative was prepared using the same ratio of phenol to triethylene tetramine as polyfurfuryl alcohol to triethylene tetramine. The resulting Phenol-TETA derived Mannich base epoxy curative was reacted with the same liquid Bis Phenol "A" based epoxy resin (EPILOK 60-600), with the same curative to epoxy resin ratio, to form a cured epoxy resin ("Phenol-TETA cured epoxy").

The two Mannich bases were analysed to determine Gardner colour scale score (using the method according to EN ISO 4630:2015); amine value (primary, secondary and tertiary amine group nitrogen content measured according to EN ISO 9702:1998); and apparent viscosity (using a rotational viscometer with defined shear rate according to EN ISO 2555:2018). Reactivity of the curatives was determined in the form of gel-time ("pot-life") on reaction with liquid Bis Phenol "A" based epoxy resin (EPILOK 60-600) (according to BS EN ISO 10364:2018). A theoretical determination of the Active Hydrogen Equivalent Weight (AHEW) was also determined in each case. The shore "D" hardness for the resulting cured epoxy resin films was also determined (measured according to ASTM D2240). The results are provided in Table 3 below.

TABLE 3

| Property | Measurement Method | PFA-TETA | Phenol-TETA |
|---|---|---|---|
| Colour - Gardner | EN ISO 4630: 2015 | 16 | 4 |
| Amine value | EN ISO 9702: 1998 | 769 mg KOH/gm | 735 mg KOH/gm |
| Viscosity @ 25° C. | EN ISO 2555: 2018 | 1230 mPa · s | 1100 mPa · s |
| AHEW | Calculated | 47 | 47 |
| Gel-time* | EN ISO 10364: 2018 | 31.2 minutes | 20.7 minutes |
| Shore D Hardness* | ASTM D2240 | 86 | 86 |

*measured value of cured epoxy

Each of the two curing agents can be considered highly responsive and offer similar reactivity profiles. They have relatively short pot-lives and highly exothermic gel-times in mass [150 GM] with peak exotherms exceeding 170° C. when tested under semi-adiabatic conditions. The highly reactive nature of the materials leads to favourable fast-low temperature thin film cure rates. Both systems provided clear, glossy, tack free films, free from defects.

Chemical resistance of the cured epoxy films was subsequently measured by exposing round disc-shaped samples of identical dimensions to chemical attack. Specifically, the samples were weighed, incorporated into a sealed glass jar, and submerged in a known volume of sodium hydroxide (3% w/v, 10% w/v and 32% w/v aqueous solutions) and sulphuric acid (5% w/v, 10% w/v and 50% w/v aqueous solutions). Samples were stored at a fixed temperature for a specified time then removed, dried and re-weighed to determine the extent of any weight change as a result of dissolution/degradation of the sample. Results are shown in Table 4 below.

TABLE 4

| Cured Epoxy | Weight Change (%) in Sodium Hydroxide solutions of different concentration | | | Weight Change (%) in Sulphuric Acid solutions of different concentration | | |
|---|---|---|---|---|---|---|
| | 3% w/v NaOH | 10% w/v NaOH | 32% w/v NaOH | 5% w/v $H_2SO_4$ | 10% w/v $H_2SO_4$ | 50% w/v $H_2SO_4$ |
| PFA-TETA Cured epoxy | 0.025 | 0.02 | 0.01 | <0.1 | <0.1 | <0.1 |
| Phenol-TETA ured epoxy | 0.03 | 0.02 | 0.01 | 2.36 | 7.9 | 5.6 |

Near identical resistance to alkaline media (NaOH) was exhibited by both cured epoxy resins. However, the conventional Phenol-TETA cured epoxy showed weight change of almost 8% in a 10% sulphuric acid solution, whereas the PFA-TETA cured epoxy prepared in accordance with the invention exhibited less than 0.1% weight change in all concentrations tested. This demonstrates a surprising degree of chemical resistance (particularly acid resistance) conferred by the Mannich base curative according the present invention.

The invention claimed is:
1. A method of preparing a Mannich base for use as an epoxy resin curative, said method comprising:
    i) contacting a) a furfuryl alcohol component selected from the group consisting of polyfurfuryl alcohol, and a co-polymer of furfuryl alcohol, wherein the co-polymer of furfuryl alcohol comprises a phenol species, with b) an amine component selected from the group consisting of a primary monoamine, a secondary monoamine, a polyamine having primary amino groups, a polyamine having secondary amino groups, and a polyamine having primary and secondary amino groups; wherein the amine component is a saturated or unsaturated aliphatic amine and the molar range of amine component to furfuryl alcohol component range from 0.01:1 to 10:1; and ii) obtaining a Mannich base; and wherein step i) is performed in the presence of an aldehyde.

2. A method according to claim 1, wherein the method comprises contacting a furfuryl alcohol component selected from the group consisting of polyfurfuryl alcohol and a co-polymer of furfuryl alcohol, with an amine component selected from the group consisting of a primary monoamine, a secondary monoamine, a polyamine having primary amino groups, a polyamine having secondary amino groups, and a polyamine having primary and secondary amino groups, and, prior to the contacting step i), the furfuryl alcohol component is modified by a condensation reaction with an aldehyde.

3. A method according to claim 1, wherein after contacting step i) is undertaken, the product of that step is modified by a condensation reaction with an aldehyde.

4. A method according to claim 1, wherein the amine component is a monoamine selected from alkyl monoamines, alkanolamines and poly(alkylene oxide) amines.

5. A method according to claim 1, wherein the amine component is a polyamine selected from the group consisting of 1) an aliphatic primary di- or tri-amine; 2) an aliphatic secondary amino-containing tri-amine having two primary aliphatic amino groups; and 3) a polyamine having one or two secondary amino groups.

6. A method according to claim 5, wherein the polyamine is an aliphatic primary diamine selected from the group consisting of: 2,2-dimethyl-1,3-propanediamine, 1,3-pentanediamine (DAMP), 1,5-pentanediamine, 1,5-diamino-2-methylpentane (MPMD), 2-butyl-2-ethyl-1,5-pentanediamine (C11-nododiamine), 1,6-hexanediamine, 2,5-dimethyl-1,6-hexanediamine, 2,2 (4), 4-trimethylhexamethylenediamine (TMD), 1,7-heptanediamine, 1, 8-octanediamine, 1,9-nonanediamine, 1,10-decanediamine, 1,11-undecandiamine, 1,12-dodecanediamine, 1,2-,1,3- or 1,4-diaminocyclohexane, bis(4-aminocyclohexyl) methane (H 12-MDA), bis(4-amino-3-methylcyclohexyl) methane, bis(4-amino-3-ethylcyclohexyl) methane, bis(4-amino-3,5-dimethylcyclohexyl) methane, bis(4-amino-3-ethyl-5-methylcyclohexyl) methane, 1-amino-3-aminomethyl-3,5,5-trimethylcyclohexane (isophoronediamine or IPDA), 2- or 4-methyl-1,3-diaminocyclohexane or mixtures thereof, 1,3-bis(aminomethyl) cyclohexane, 1,4-bis(aminomethyl) cyclohexane, 2,5 (2,6)-bis (aminomethyl) bicyclo [2.2.1] heptane (NBDA), 3 (4), 8 (9)-Bis(aminomethyl) tricyclo [5.2.1.0$^{2'6}$] decane, 1,4-diamino-2,2,6-trimethylcyclohexane (TMCDA), 3,9-bis(3-aminopropyl)-2,4,8,10-tetraoxaspiro-[5.5]-undecane, and combinations thereof; or wherein the polyamine is an aliphatic primary triamine selected from the group consisting of: 4-aminomethyl-1,8-octanediamine, 1,3,5-tris(aminomethyl) cyclohexane, tris(2-aminoethyl) amine, tris(2-amino-propyl) amine, tris(3-aminopropyl) amine and combinations thereof.

7. A method according to claim 5, wherein the polyamine is an ether-group-containing aliphatic primary diamine selected from the group consisting of: bis(2-aminoethyl) ether, 3,6-dioxaoctane-1,8-diamine, 4,7-dioxadecane-1, 10 diamine, 4,7-dioxadecane-2,9-diamine, 4,9-dioxadodecane-1,12-diamine, 5,8-dioxadodecane-3,10-diamine, 4,7,10-trioxatridecan-1,13-diamine, or the oligomers of any of foregoing; polytetrahydrofurandiamines, cycloaliphatic diamines containing ether groups, and polyoxyalkylenediamines; or wherein the polyamine is an ether-group-containing aliphatic primary tri-amine selected from the group consisting of polyoxyalkylenetriamines.

8. A method according to claim 5, wherein the polyamine is an aliphatic secondary amino-containing tri-amine having two primary aliphatic amino groups selected from the group consisting of: 3-(2-aminoethyl) aminopropylamine, bis(hexamethylene) triamine (BHMT), diethylenetriamine (DETA), triethylenetetramine (TETA), tetraethylenepentamine (TEPA), pentaethylenehexamine (PEHA) or higher homologs of linear polyethyleneamines products of the multiple cyanoethylation or cyanobutylation and subsequent hydrogenation of primary polyamines having at least two primary amino groups, N-(2-aminoethyl)-1,3-propanediamine (N3-amine), N,N'-bis(3-aminopropyl) ethylenediamine (N4-amine), N,N'-bis(3-aminopropyl)-1,4-diaminobutane, N5-(3-aminopropyl)-2-methyl-1,5-pentanediamine, N3-(3-aminopentyl)-1,3-pentanediamine, N5-(3-Amino-1-ethyl-propyl)-2-methyl-1,5-pentanediamine, N,N'-bis(3-amino-1-ethyl-propyl)-2-methyl-1,5-pentanediamine, and combinations thereof.

9. A method according to claim 1, wherein the amine component is a polyamine, the polyamine further comprising amido or polyamide functional groups derived from adduction of the polyamine with one or more epoxides and/or modification with one or more fatty acids.

10. A method according to claim 1, wherein the furfuryl alcohol component is a co-polymer of furfuryl alcohol, and the co-polymer of furfuryl alcohol is derived from the co-polymerisation of furfuryl alcohol with phenol or a substituted phenol selected from the group consisting of: alkyl substituted phenols, aryl substituted phenols, aralkyl substituted phenols, cycloalkyl substituted phenols, alkenyl-substituted phenols, alkoxy substituted phenols, aryloxy substituted phenols, and halogen-substituted phenols.

11. A method according to claim 1, wherein the aldehyde has the formula: $R_1CH=O$, where $R_1$ is H or a $C_1$-$C_8$ hydrocarbyl group.

12. A method according to claim 11, wherein the aldehyde is selected from the group consisting of: formaldehyde, acetaldehyde, propionaldehyde, butylaldehyde, furfuraldehyde, and benzaldehyde.

13. A method according to claim 1, wherein the Mannich base obtained in step ii) is modified by adduction.

14. A method according to claim 1, wherein the Mannich base obtained in step ii) is modified with an accelerator.

15. A method according to claim 1, wherein the Mannich base obtained in step ii) is modified with a diluent or extender.

16. A Mannich base prepared, by the method according to claim 1.

17. A cured epoxy resin prepared by a method comprising:
a) contacting an epoxy resin with a Mannich base as defined in claim 16; and
b) forming a cured epoxy resin.

* * * * *